United States Patent Office 3,630,976
Patented Dec. 28, 1971

3,630,976
PROCESS FOR THE POLYMERIZATION OF VINYL CHLORIDE
Alexis Mathieu, Brussels, Belgium, assignor to Solvay & Cie, Brussels, Belgium
No Drawing. Continuation-in-part of application Ser. No. 483,837, Aug. 30, 1965. This application May 2, 1969, Ser. No. 821,467
Claims priority, application Belgium, Sept. 9, 1964, 2,741
Int. Cl. C08f *3/30, 1/11*
U.S. Cl. 260—92.8 W        3 Claims

ABSTRACT OF THE DISCLOSURE

Vinyl chloride is ploymerized in aqueous suspension in a one step operation by introducing into an aqueous meduim vinyl chloride, a polymerization catalyst and a suspension-forming agent comprised of polyvinyl alcohol and one or more products derived from the condensation of a polyoxyalkylene glycol and a monomeric polyamine. The polyvinyl chloride product is obtained in the form of highly porous granules.

---

This application is a continuation-in-part of our U.S. application Ser. No. 483,837, filed Aug. 30, 1965 now abandoned.

BACKGROUND OF THE INVENTION

The present invention relates to a process for the polymerization of vinyl chloride to produce a resin in the form of highly porous granules.

In many applications, polyvinyl chloride must be plasticized before being processed; for this reason the polymer should be able to pick up or absorb plasticizer in a wide range of proportions. Further, to be plasticized economically, the polymer should be able to pick up the required amount of plasticizer quickly.

The proportion of plasticizer which can be absorbed or taken up by a polymer is connected with the porosity of its granules. Thus, in order that a resin be able to absorb a substantial proportion of plasticizer quickly, it is necessary that the resin be in the form of granules of sufficient porosity.

Working in aqueous suspension in the presence of well known dispersing agents, polymerization cannot be carried out under convenient conditions and still produce a polymer in the form of highly porous granules. Certain dispersing agents cause excessive caking, and may even give rise to the cohesion of substantial quantities of material. Others lead to colored or thermally unstabie products.

Many known dispersing agents, and this applies particularly to polyvinyl alcohol, give products in the form of dense granules which are mostly spherical and have only moderate porosity. Still other methods have special requirements which involve extra process steps and additional process equipment.

SUMMARY OF THE INVENTION

The principal object of the present invention is the provision of the simple and economical process for polymerizing vinyl chloride in aqueous suspension to provide polyvinyl chloride in the form of highly porous granules.

A particular object of this invention is the provision of a one-step process for polymerizing vinyl chloride in aqueous suspension to yield a polymer product in granular, porous forms.

The above mentioned disadvantages are avoided and the present objects and others are accomplished by the present invention which will be described below.

It has been found that vinyl chloride may be polymerized in aqueous suspension by means of a simple and economical one-step process to form a polymer in the form of highly porous granules by using a particular mixture of dispersing agents.

According to the present invention, vinyl chloride is polymerized in aqueous suspension in the presence of a catalyst by a one-step process which comprises introducing into an aqueous meduim vinyl chloride, the polymerization catalyst and a suspension-forming agent comprised of polyvinyl alcohol and one or more condensation products derived from polyoxyalkylene glycol and a monomeric polyamine.

DESCRIPTION OF THE PREFERRED EMBODIMENTS

It is essential in the present process, that the suspension-forming agent be composed of both polyvinyl alcohol and one or more condensation products derived from a polyoxyalkylene glycol and a polyamine. Used alone, each of these dispersing agents fails to give the desired result. As has been emphasized above, polyvinyl alcohol gives resins in the form of granules which for certain applications are not sufficiently porous.

The use of a dispersing system containing over 90% by weight of the amine condensation products, moreover, causes such caking in the polymerization vessel that on the whole the polymer is unusable.

Generally, to produce a polymer in which the granules have a sufficiently high porosity, a dispersing system containing 10–50% by weight of the amine condensation product is preferable. However, even a dispering system containing only 5% by weight of the condensation product gives useful results.

The polyoxyalkylene glycol forming part of the amine condensation product may be chosen from the polymers if alkylene glycols and their copolymers with each other. Polyoxyethylene glycols, polyoxypropylene glycols, polyoxybutylene glycols, polyoxy-(ethylene-propylene) glycols, and polyoxystyrene glycols may be mentioned as specific examples.

The second constituent of the amine condensation product may be any polyamine, for example ethylene diamine propylene diamine, butylene diamine or hexamethylene diamine.

The total amount of the dispersing agent used in the process of the present invention is not critical. It does not affect the porosiy of the granules of polyvinyl chloride obtained.

The polymerization catalysts used are the orthodox ones, for example organic peroxides such as benzoyl peroxide or lauroyl peroxide, or a catalyst of the azodiisobutyronitrile type.

The process of the present invention is accomplished by charging the catalyst, suspension sytem, i.e. a mixture of polyvinyl alcohol and at least one condensation product derived from a polyoxyalkylene glycol and a polyamine, and the vinyl chloride into water contained in a reactor. The temperature of the mixture is usually raised within the range of about 50° C., although the reaction may be carried out at lower temperatures, such as room temperature depending in the catalyst system used. The mixture is then agitated until polymerization is substantially complete.

The present process is particularly economical, requiring only a single reaction step and a single reactor. It is not necessary to premix any of the constituents of the present reaction, and in particular it is not necessary to premix the suspension system or any part thereof with the vinyl chloride.

Polyvinyl chloride obtained by the process of this invention is able to absorb, that is take up a substantial proportion of plasticizer rapidly, and hence, it forms readily, dry mixtures with the plasticizer which are free flowing and which can be manipulated easily.

Furthermore the mixtures of resin and plasticizer are very homogeneous and after processing give finished products such as films which are free from major imperfections such as "fish-eyes."

In the examples given below, the degree of porosity of the polymer granules is expressed as the time taken for a polyvinyl chloride specimen to take up a given proportion of plasticizer. This absorption time is determined by an empirical measurement technique developed by the applicant. The results given here are, of course, only of value for the purpose of comparison.

In this method, 100 grams of resin and 30 grams of a plasticizer such as dioctyl phthalate are charged into a planetary mixer provided with a thermostatic heating system. The mixture is agitated at a constant temperature of 50° C.

Regularly every minute, a specimen of the mixture is withdrawn and made into a pastille which is pressed between two sheets of absorbent paper under a pressure of 6 kilograms.

The absorption time is the time that elapses between the beginning of the mixing operation and the time when the mixture is dry, that is to say, the time at which no trace of plasticizer can any longer be seen on the absorbent paper.

In practice a resin will be considered to have granules of high porosity if the absorption time measured by the method described above is below 15 minutes.

In the examples that follow, it will be noted that Examples 1 and 2 are given for the sake of comparison; from the results of Examples 1 and 2 the technical advance represented by the process of the present invention as illustrated in Examples 3 and 4 is readily appreciated. Examples 3 and 4 have been set forth to illustrate the best mode contemplated for carrying out the present invention but are not to be construed as limiting the invention in any manner whatsoever.

Example 1—Comparison

Into a 5 liter autoclave are charged 2800 grams of distilled water, 5.5 grams of polyvinyl alcohol with a hydrolysis value of 75%, and 4 grams of lauroyl peroxide. Part of the oxygen in the autoclave is removed by means of a vacuum pump. 1400 grams of vinyl chloride is added, and the temperature inside the autoclave is raised to 50° C. with agitation of the reactants at a uniform rate.

After 10 hours reaction, the proportion of vinyl chloride converted is about 90%. The incrustation in the autoclave is slight.

The polymer obtained is washed and dried to constant weight in a ventilated oven at 65° C.

The resin has a specific surface area of about 8,000 sq. cm. per gram.

Using the method of measurement described above, the plasticizer absorption value is found to be over 30 minutes.

Example 2—Comparative

Vinyl chloride in an amount of 1,400 grams is polymerized under the same conditions as in Example 1 except in that the polyvinyl alcohol is replaced by a condensation product derived from a polyoxy-(ethylene-propylene) glycol and ethylene diamine (Tetronic 707 which is a condensation product having a molecular weight of 11,000 and containing 75% by weight of ethylene oxide).

After 10 hours reaction, the conversion figure is only 70%. The incrustation in the autoclave is considerable and the resin obtained unusable.

Example 3

Vinyl chloride in an amount of 1,400 grams is polymerized under the same conditions as in Example 1 but using as a dispersing system a mixture comprising 5.5 grams of polyvinyl alcohol with a hydrolysis value of 75% and 1 gram of a condensation product derived from a polyoxy-(ethylene-propylene) glycol and ethylene diamine.

After 10 hours reaction, the conversion figure is about 90%. The incrustation in the autoclave is slight.

The resin obtained has a specific surface area of about 13,000 sq. cm. per gram. Its plasticizer absorption time is 6 minutes.

Example 4

Vinyl chloride in an amount of 1,400 grams is polymerized under the conditions of Example 3 but using the constitutents of the dispersing system in the amounts of 4 and 2.5 grams, respectively.

After 10 hours reaction, the conversion figure is about 90%. The incrustation of the autoclave is slight.

The resin obtained has a specific surface area of about 15,000 sq. cm. per gram. Its plasticizer absorption time is 4 minutes.

This resin was also subjected to centrifugal test. In this test, polyvinyl chloride was stirred into a paste with an excess quantity of plasticizer and the mass was allowed to stand at room temperature for 10 minutes. Then the plasticizer that had not been adsorbed was centrifuged at a rate of 5,000 r.p.m. The amount of plasticizer adsorbed per 100 grams of polyvinyl chloride serves as a measure for the adsorptive power. The larger the quantity, the better the adsorptive power. The present resin was found to have adsorbed 58 grams of plasticizer at 25° C.

What I claim and desire to secure by Letters Patent is:

1. A one-step process for polymerizing vinyl chloride in aqueous suspension in the presence of a catalyst to produce a resin in the form of highly porous granules which comprises introducing into an aqueous medium in a single polymerization zone without previous mixing said vinyl chloride, said catalyst and a suspension-forming agent comprised of a mixture of 95–10% by weight of polyvinyl alcohol and 5–90% by weight of one or more products derived from the condensation of a polymer or copolymer of at least one alkylene glycol selected from the group consisting of polyoxyethylene glycol, polyoxypropylene glycol, polyoxybutylene glycol, polyoxy-(ethylene-propylene) glycol and polyoxystyrene glycol with a monomeric polyamine selected from the group consisting of ethylene diamine, propylene diamine, butylene diamine and hexamethylene diamine and agitating said mixture until the polymerization is substantially complete.

2. One step process for the polymerization of vinyl chloride according to claim 1 in which said suspension-forming agent is a mixture of 90–50% by weight of polyvinyl alcohol and 10–50% by weight of one or more of said condensation products derived from a polyoxyalkylene glycol and said polyamine.

3. In a process for the polymerization of vinyl chloride in aqueous suspension in the presence of a suspension agent and a catalyst soluble in the monomer, to produce a resin having the form of highly porous granules, the improvement which comprises introducing into an aqueous medium without previous mixing vinyl chloride, said catalyst and a suspension-forming agent comprising a mixture of polyvinyl alcohol and one or more condensation products derived from a polyoxyalkylene glycol selected from a member of the group consisting of polyoxyethylene glycol, polyoxypropylene glycol, polyoxybutylene glycol, polyoxy-(ethylene-propylene) glycol and polyoxystyrene glycol and a monomeric polyamine selected from a member of the group consisting of ethylene diamine, propylene diamine, butylene diamine and hexamethylene diamine.

References Cited

UNITED STATES PATENTS 3,161,623   12/1964   Kühne.

JOSEPH L. SCHOFER, Primary Examiner

J. A. DONAHUE, Jr., Assistant Examiner